United States Patent Office 3,522,058
Patented July 28, 1970

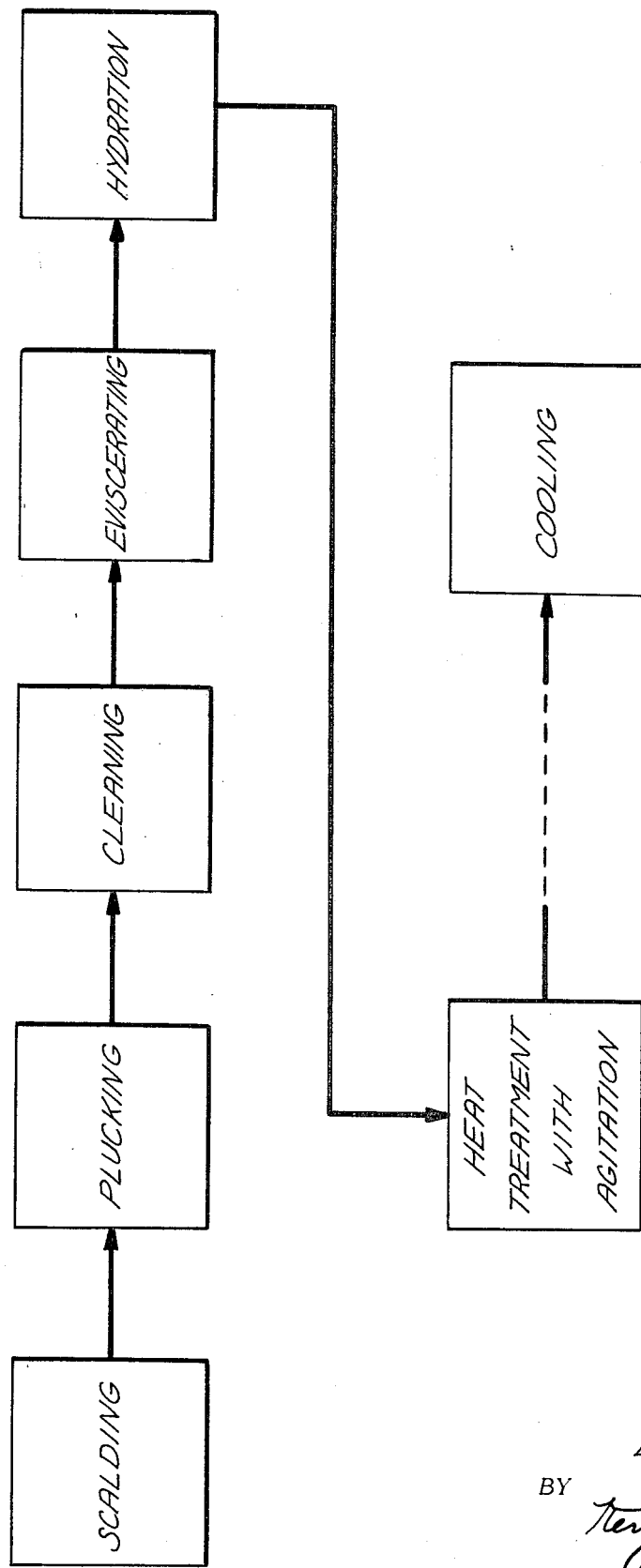

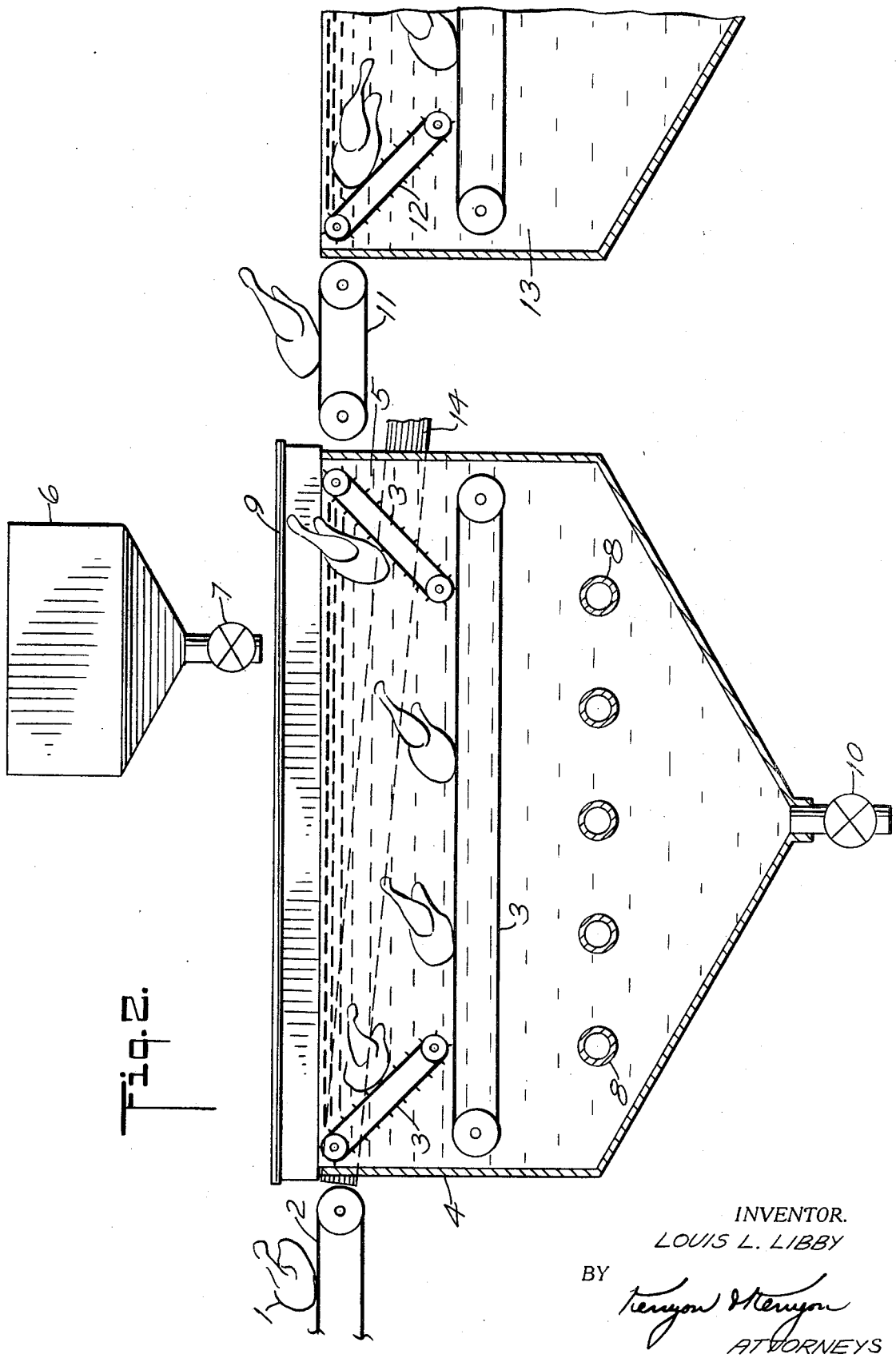

3,522,058
PROCESS FOR TREATING POULTRY PRODUCTS
Louis L. Libby, Bal Harbour, Fla., assignor to Tra-Way Corp., Bal Harbour, Fla., a corporation of New York
Filed Jan. 19, 1967, Ser. No. 610,437
Int. Cl. A22c 21/00; A23b 1/06
U.S. Cl. 99—107                                    4 Claims

ABSTRACT OF THE DISCLOSURE

In this invention poultry products which have been treated in the conventional manner are subsequently immersed in a boiling brine solution in order to remove the cuticle of the skin of the poultry product where substantial amounts of bacteria are located, and if desired, the poultry may then be subjected to a cooling step to remove the heat absorbed by the poultry during the time it was immersed in the brine solution. Poultry treated in this manner has an enhanced shelf life and better flavor due to the sealing in of the natural juices of the poultry by the heat treatment.

---

This invention relates to the processing of poultry such as chickens, geese, ducks, turkey and the like. More particularly, this invention relates to a process of treating poultry so as to inhibit bacteria growth on the poultry, to inhibit weeping and to reduce the loss of natural juices from the poultry.

In the conventional processing of poultry products, the birds are killed and then scalded with water at temperatures in the range of about 128 to 140° F. to loosen the feathers which are removed by mechanical plucking machines. Plucking is followed by cleaning the poultry and it is customary at that time to eviscerate the birds. Following cleaning, the birds are generally cooled or chilled by soaking them in an ice-slush bath or chilled water bath for a period of time sufficient to permit hydration of the carcasses which results in an increase in weight of about 8% of the poultry. Subsequent to the hydration step, the birds are packaged either whole or in pieces and are shipped either fresh or frozen.

It is well known that poultry products spoil in a relatively short period of time and much research has been directed towards eliminating this problem. Research has shown that the skin of poultry will spoil before the kidney, liver, gizzards, etc., a large percentage of the time. As a means of alleviating this problem, it has been suggested to reduce the bacteria on the skin by the addition of various chemicals to the poultry during the processing of the product. These methods generally have not been successful for one reason or another, e.g. because of the development of off-taste, odor, etc. For instance, it has been reported that in one series of tests commercially processed broiler halves were dipped in a 70% ethyl alcohol solution for 30 seconds, wrapped in a polyethylene bag and held at 33° F. Control birds were dipped in water and held in a similar manner. The alcohol treated birds showed an immediate lower skin surface bacteria count and a 4 to 5 day longer shelf life than the controls. Test comparisons, however, indicated a decided preferance for the control birds. The alcohol dipped birds were described as strong, rancid or medicinal (K. N. Hall and J. V. Spenser, Poultry Science, 43, 573–576, 1964, Washington State University, Pullman, Wash.).

Another major problem associated with the conventional treatment of poultry described above is that of weeping, i.e. the loss of moisture through the skin and cavity of the bird. This weeping occurs particularly when the birds are cut up at the processing plant and shipped fresh, or when shipped whole and cut up at the supermarket, or during the defrosting period when shipped frozen.

It is the primary object of this invention to provide a process which inhibits the growth of bacteria on processed poultry without the use of artificial preservatives and which eliminates weeping and the loss of natural juices from poultry products.

According to this invention, there is provided a process which comprises immersing hydrated poultry in a hot agitated brine solution for a period of time sufficient to remove the cuticle of the skin of the poultry. Upon removal from the brine solution, the poultry may be quickly cooled, if desired, to remove the heat from the poultry which was acquired during the immersion of the poultry in the hot brine solution.

The immersion of the poultry in the hot agitated brine solution removes the cuticle of the skin of the poultry which contains a substantial amount of the bacteria present in a freshly killed bird. It should be noted that this treatment permits the inhibition of bacteria in poultry without the use of artificial preservatives. In addition, the agitation in the hot brine solution causes some of the water which was absorbed in the poultry during the hydration step to be expelled with the consequent small shrinkage in the size of the bird. This shrinkage has a sealing effect and causes the natural poultry juices to be sealed in the poultry product thereby enhancing the flavor of the poultry. This sealing effect also helps eliminate weeping of the poultry product during the defrosting of frozen products or during shipment and display of fresh products.

In carrying out the process, the whole or cut up birds are passed through the boiling brine solution for a short period of time. The actual amount of time will depend to a large extent upon the size and quantity of poultry products being treated. I have found, however, that in many instances a treatment time of about ten seconds to about two minutes, and preferably about 20 to 60 seconds is satisfactory. The concentration of the brine solution may obviously vary over a wide range depending upon such things as the size of the vat, the amount of time that the poultry is to be immersed in the solution, etc. I have found that a brine solution containing about 8–12 ounces of salt for each gallon of water is in general quite satisfactory.

If desired, the product may be flavored by adding to the brine, seasoning such as extract of pepper, garlic powder and other condiments and spices. During the processing of the poultry which is preferably done on a continuous basis, the cuticle is removed by the agitation of the brine and falls to the bottom of the vat. Other extraneous matter on the surface of the bird floats to the top of the brine solution where it is skimmed off. The boiling brine also releases bone dust, splinters, cartilage, etc. which descend to the bottom of the tank where they are removed.

The poultry as it emerges from the vat is thoroughly cleaned and some of the water which had been absorbed by the poultry product during the conventional hydration step has been expelled with a consequent slight shrinkage in the size of the product. This shrinkage causes the natural juices in the poultry to be sealed in and thereby enhances the flavor of the product.

I have found it desirable on many occasions to remove the heat produced in the poultry product due to the immersion in the boiling brine solution, by subjecting the product to a cooling step. I prefer to remove the heat by passing the poultry product through a slush ice-water bath for a short period of time such as from about 10 seconds to about 2 minutes, preferably about 20 to 60 seconds. If desired, other conventional heat transfer means may be employed. The time of treatment will of course depend on the specific method used for cooling. Obviously the cooler the temperature of the heat transfer means, the shorter the period of treatment for removing the heat from the poultry.

This process whitens the poultry product and gives it a clean attractive appearance. At the conclusion of the process the poultry products are packaged. Whole birds with giblets are packed in a shrink film bag. Cut birds are layed on paperboard trays and overwrapped with a film, such as Cryovac, Mylar and heat sealed. The product is now thoroughly sanitized and can be shipped fresh packed in ice, or shipped dry in a refrigerated truck or frozen and stored at zero temperatures for future shipment.

For a more detailed description of the invention, reference should now be had to the following drawings in which FIG. 1 represents a schematic drawing showing the various steps in the processing of poultry parts, and FIG. 2 is a sectional side view of apparatus which may be employed in the process of the invention.

FIG. 1 shows schematically the various steps in the processing of poultry both conventionally and in accordance with the invention. The five steps of scalding, plucking, cleaning, eviscerating and hydration are the steps usually associated with the conventional treatment of poultry, although a particular processor may on occasion omit one or more of these steps and substitute some other step to accomplish the same purpose. The two steps on the second line of the drawing represent the steps of this invention which are employed after the conventional processing of poultry is concluded. These steps are the heat treatment of the poultry in a boiling brine solution, and if desired, a cooling step to remove the heat absorbed by the poultry during the heat treatment step.

FIG. 2 shows a sectional view of apparatus which may be used in the process of this invention. The apparatus is conventional and it preferably is installed at the end of the conventional processing line for poultry. Thus following the conventional hydration step, the poultry 1 is placed upon a conveyer belt 2 which moves the poultry to conveyer belt 3 in vat 4. Conveyer belt 3 moves the poultry product through vat 4 which contains hot boiling brine 5 which is maintained at a constant level by replenishing the brine from tank 6 through conduit 7. The boiling brine is maintained at this temperature by heating elements 8 located in the vat 4. As the poultry moves through the boiling brine solution, the brine which has an antiseptic effect together with the agitation thereof causes the cuticle of the skin of the poultry to be removed and to fall to the bottom of the vat. Cartilage, bone fragments and other heavier materials which are removed by the agitation of the boiling brine solution also fall to the bottom of the vat, below the heating elements, which is termed the cold area, and are removed through valve 10. Other foreign matter on the bird floats to the top of the brine solution where it forms a scum on the top of the brine solution and is removed by skimmer 9 which moves from side to side of the tank and which causes the scum to pass into trough 14 where it is discharged from the system. The poultry parts emerge from the vat on conveyer belt 3 where they are transferred to conveyer belt 11. The poultry may at this point be prepared for packaging.

In the preferred method of the invention, however, the poultry on conveyer belt 11 is transferred to conveyer belt 12 which passes the poultry through a slush ice-water bath 13 for a short period of time in order to remove the heat absorbed during the immersion of the poultry in the boiling brine solution.

After passing through the cooling step, the poultry may then be packaged for shipment. The treatment of poultry in the aforementioned manner produces a product which retains its freshness longer, has a longer shelf life, does not weep and retains its natural juices which have been sealed in during the processing of the poultry.

The following example illustrates the effectiveness of the present process in reducing bacteria and enhancing the shelf life of the product. Chickens were killed in a U.S.D.A. inspected plant in Georgia on a Monday, were packed in ice and shipped to a supermarket warehouse in Miami, Fla., arriving on Wednesday and were placed on sale in the stores on Thursday. Chickens were purchased on Thursday, cut up into parts using the breasts for the test. One piece of breast was processed in accordance with the subject invention, another piece was maintained as the control and was unprocessed. Each breast was placed on an aluminum tray covered with cellophane and heat sealed and sent to a laboratory. Upon arrival at the laboratory, the control unprocessed chicken breast contained a bacteria count of 35,000 per gram. The chicken breast processed in accordance with this invention contained only 4,800 bacteria per gram.

In a further experiment, a gram of meat was taken from each of these chicken breasts and incubated for 48 hours. After four days (including the 48 hour incubation period) the unprocessed control breast increased in bacteria to 810,000 per gram, whereas the breast processed in accordance with this invention only had a bacteria count of 22,000. There was considerable moisture (water and natural juice) that ran out of the unprocessed chicken breast. A test made on this moisture on the fourth day contained a bacteria count of 3,300,000 bacteria per gram.

After the poultry has been immersed in the hot boiling brine and then subjected to the cooling step, if desired, it may be treated in accordance with the process described in my U.S. Pat. No. 3,078,172, the disclosure of which is incorporated herein by reference.

Briefly stated, this patent discloses a method for sealing in the natural juices of a variety of food products among which is poultry by coating the uncooked food products with an edible cooking material such as vegetable oils. The product may be coated with a layer of sealing material such as flour or batter, which is preferably applied before the coating of cooking material. The food product may also contain a coating of bread crumbs which is generally applied after the batter, but may be applied either before or after the layer of the cooking material.

The poultry products of the present invention are uniquely suited for coating in accordance with the process of my said U.S. Pat. No. 3,078,172. Hence after completion of the heat treatment and if desired, the cooling step, the poultry product may be coated with cooking material and if desired a coating of sealing material, and/or a coating of bread crumbs. As described above, I have found that seasoning may also be incorporated in the product, preferably by mixing it with the sealing material. After the poultry product has been coated with the cooking material and/or sealing material and/or bread crumbs, the poultry may be shipped in the fresh state where it may be sold directly to the consumer or it may be frozen and stored in warehouses for subsequent sale.

Having thus provided a written description of my invention, it should be understood that the appended claims define the scope thereof.

What is claimed is:

1. A process for inhibiting the growth of bacteria and for enhancing the flavor of scalded, plucked, cleaned, eviscerated, and hydrated fresh poultry products which comprises immersing said fresh poultry in a boiling brine solution for a period of time sufficient to remove the cuticle of the poultry skin and to seal the natural juices in the poultry and then removing the poultry from the brine solution.

2. A process according to claim 1 wherein the poultry is immersed in the boiling brine solution for a period of about 10 seconds to 2 minutes.

3. A process according to claim 1 comprising quickly cooling the poultry after it has been removed from the brine solution to remove from said poultry heat absorbed during the brine immersion step.

4. A process according to claim 3 where the poultry is cooled in an ice-slush bath for a period of about 10 seconds to about 2 minutes.

References Cited

UNITED STATES PATENTS

| | | | |
|---|---|---|---|
| 2,670,295 | 2/1954 | Ash | 99—229 X |
| 2,885,291 | 5/1959 | Sengelaub et al. | 99—107 |
| 3,025,170 | 3/1962 | Murphy et al. | 99—107 X |
| 3,047,395 | 7/1962 | Rusoff et al. | 99—107 X |
| 3,078,172 | 2/1963 | Libby | 99—107 X |
| 3,094,740 | 6/1963 | Reeves | 17—11.2 |

HYMAN LORD, Primary Examiner

U.S. Cl. X.R.

17—51; 99—194